US010561953B2

(12) United States Patent
Reiche et al.

(10) Patent No.: US 10,561,953 B2
(45) Date of Patent: *Feb. 18, 2020

(54) INTERACTIVE VIDEO GAME SYSTEM COMPRISING TOYS WITH REWRITABLE MEMORIES

(71) Applicant: Activision Publishing, Inc., Santa Monica, CA (US)

(72) Inventors: Paul Reiche, Santa Monica, CA (US); Ray West, Santa Monica, CA (US); Robert Leyland, Santa Monica, CA (US); Daniel Neil, Santa Monica, CA (US); Kern Corrigan, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 15/724,556

(22) Filed: Oct. 4, 2017

(65) Prior Publication Data

US 2018/0021685 A1 Jan. 25, 2018

Related U.S. Application Data

(63) Continuation of application No. 14/137,054, filed on Dec. 20, 2013, now Pat. No. 9,802,130.

(51) Int. Cl.
*A63F 13/95* (2014.01)
*A63F 13/98* (2014.01)

(52) U.S. Cl.
CPC .............. *A63F 13/95* (2014.09); *A63F 13/98* (2014.09)

(58) Field of Classification Search
USPC .......................................... 463/31
See application file for complete search history.

(56) References Cited

U.S. PATENT DOCUMENTS

| | | | | | |
|---|---|---|---|---|---|
| 5,876,262 | A | * | 3/1999 | Kelly | A63H 33/22 108/23 |
| 6,132,315 | A | * | 10/2000 | Miyamoto | A63F 13/10 463/43 |
| 6,190,174 | B1 | * | 2/2001 | Lam | A63H 33/42 273/237 |
| 6,290,565 | B1 | * | 9/2001 | Galyean, III | A63H 3/16 273/148 B |

(Continued)

OTHER PUBLICATIONS

U.S. Appl. No. 14/137,054, filed Dec. 20, 2013, Paul Reiche Ray West Robert Leyland Daniel Neil Kern Corrigan, US 2015-0174479 A1, Office Action dated Dec. 30, 2016, Notice of Allowance dated Jun. 29, 2017.

*Primary Examiner* — Pierre E Elisca
(74) *Attorney, Agent, or Firm* — Klein, O'Neill & Singh, LLP

(57) ABSTRACT

The invention disclosed herein relates to a video game system comprising a video game console and an object or toy used in connection with the video game console, wherein the object or toy has a rewritable data storage device, and wherein the video game console stores information in the rewritable data storage device in response to game play events occurring in a first gaming session. The stored information is subsequently retrieved by the video game console in a second gaming session, and the retrieved information is used to conduct the game play of the second gaming session.

12 Claims, 16 Drawing Sheets

(56) References Cited

U.S. PATENT DOCUMENTS

| | | | | |
|---|---|---|---|---|
| 6,764,402 B2* | 7/2004 | Tajiri | ............... | A63F 13/34 463/43 |
| 7,081,033 B1* | 7/2006 | Mawle | ............... | A63F 13/02 446/175 |
| 7,131,139 B1* | 10/2006 | Meier | ............... | G06F 21/35 726/4 |
| 2001/0021670 A1* | 9/2001 | Miyamoto | ............... | A63F 13/10 463/43 |
| 2002/0132553 A1* | 9/2002 | Jelinek | ............... | A63H 3/52 446/268 |
| 2003/0008714 A1* | 1/2003 | Tajiri | ............... | A63F 13/10 463/43 |
| 2004/0229696 A1* | 11/2004 | Beck | ............... | A63F 13/02 463/40 |
| 2006/0273907 A1* | 12/2006 | Heiman | ............... | A63H 3/00 340/572.2 |
| 2008/0280684 A1* | 11/2008 | McBride | ............... | A63F 13/12 463/42 |
| 2009/0088044 A1* | 4/2009 | Yang | ............... | A63H 3/28 446/297 |
| 2009/0280905 A1* | 11/2009 | Weisman | ............... | A63F 13/08 463/40 |
| 2010/0105477 A1* | 4/2010 | Chang | ............... | A63F 9/24 463/36 |
| 2012/0157206 A1* | 6/2012 | Crevin | ............... | A63F 13/04 463/36 |
| 2012/0292854 A1* | 11/2012 | Hamermesh | ............... | A63H 1/24 273/288 |
| 2013/0072296 A1* | 3/2013 | Miyazaki | ............... | A63F 13/10 463/31 |
| 2015/0080125 A1* | 3/2015 | Andre | ............... | A63F 3/00075 463/31 |

* cited by examiner

US 10,561,953 B2

INTERACTIVE VIDEO GAME SYSTEM COMPRISING TOYS WITH REWRITABLE MEMORIES

CROSS-REFERENCE TO RELATED APPLICATION

The present application is a continuation of U.S. patent application Ser. No. 14/137,054, filed Dec. 20, 2013, the disclosures of which are incorporated by reference herein.

BACKGROUND OF THE INVENTION

The present invention relates generally to video games and, more particularly, to a video game and a toy used in connection with the video game, where the toy has functionality responsive to events or achievements in the video game.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video games, being generally provided by way of an electronic device and associated display, often lack a physical component by which a player may touch and hold a representative object associated with video game play or otherwise have a physical object representative of video game play. Despite the sometimes intense graphics action of various video games, the game play experience remains two dimensional. Merely interacting with a displayed simulated environment may not allow game players to fully relate to game play, with a sharply distinct separation between a game play world and the world physically inhabited by the game players.

BRIEF SUMMARY OF THE INVENTION

One aspect of the present invention provides a method useful in providing video game play using a game device, comprising: loading information of a game character from a first toy into the game device through a peripheral; providing gameplay in which the game character, controlled by a user using user inputs, encounters another game character; determining the occurrence of a predefined game event involving the game character and the other character; simulating the transfer of the game character from the virtual world to the physical world; and storing information of the other game character in memory of a second toy.

In another aspect of the invention, simulating the transfer of the game character from the virtual world to the physical world comprises removing the game character from gameplay and outputting audio/visual information using the peripheral's audio/visual devices.

In another aspect of the invention, the peripheral's audio/visual devices comprise a loudspeaker.

In another aspect of the invention, the peripheral's audio/visual devices comprise an LED light.

In another aspect of the invention, simulating the transfer of the game character from the virtual world to the physical world comprises removing the game character from gameplay and outputting audio/visual information using the second toy's audio/visual devices.

In another aspect of the invention, the second toy's audio/visual devices comprise a loudspeaker.

In another aspect of the invention, the second toy's audio/visual devices comprise an LED light.

In another aspect of the invention, the second toy's audio/visual devices comprise a display.

In another aspect of the invention, the information of the other game character is an identification of the other game character.

In another aspect of the invention, the information of the other game character includes information of characteristics of the other game character.

In another aspect of the invention, the predefined game event is defeat of the other game character in a battle.

In another aspect of the invention, the other game character is a game character controlled by video game instructions of the video game.

In another aspect of the invention, the other game character is a game character controlled by another user using user inputs.

In another aspect of the invention, the peripheral comprises a recess for receiving the second toy.

Another aspect of the invention provides a system useful in providing videogame play, comprising: a game device including at least one processor; a toy including rewritable memory; a peripheral device in communication with the game device, the peripheral device including circuitry for wirelessly commanding reads and writes to the rewritable memory of the toy; the at least one processor configured by program instructions to: provide gameplay in which a game character under control of user inputs to the game device encounters another game character; detect a game play event indicating capture of the other game character; command writing of information relating to the other game character to the memory of the toy; and command presentation of a sensory perceptible simulated transfer of the other game character to the toy.

Another aspect of the invention provides a peripheral device for use with a game device in providing videogame play, the peripheral device comprising: a housing having a region for placement of some toys, in some embodiments, a spatially delineated region, and a cavity for receiving a portion of other toys; a first antenna for use in wirelessly communicating with toys on the flat top surface area; a second antenna for use in wirelessly communicating with toys having a portion received by the cavity; a speaker; and at least one light source.

These and other aspects of the invention are more fully comprehended upon review of this disclosure.

DETAILED DESCRIPTION

Figure 1A:
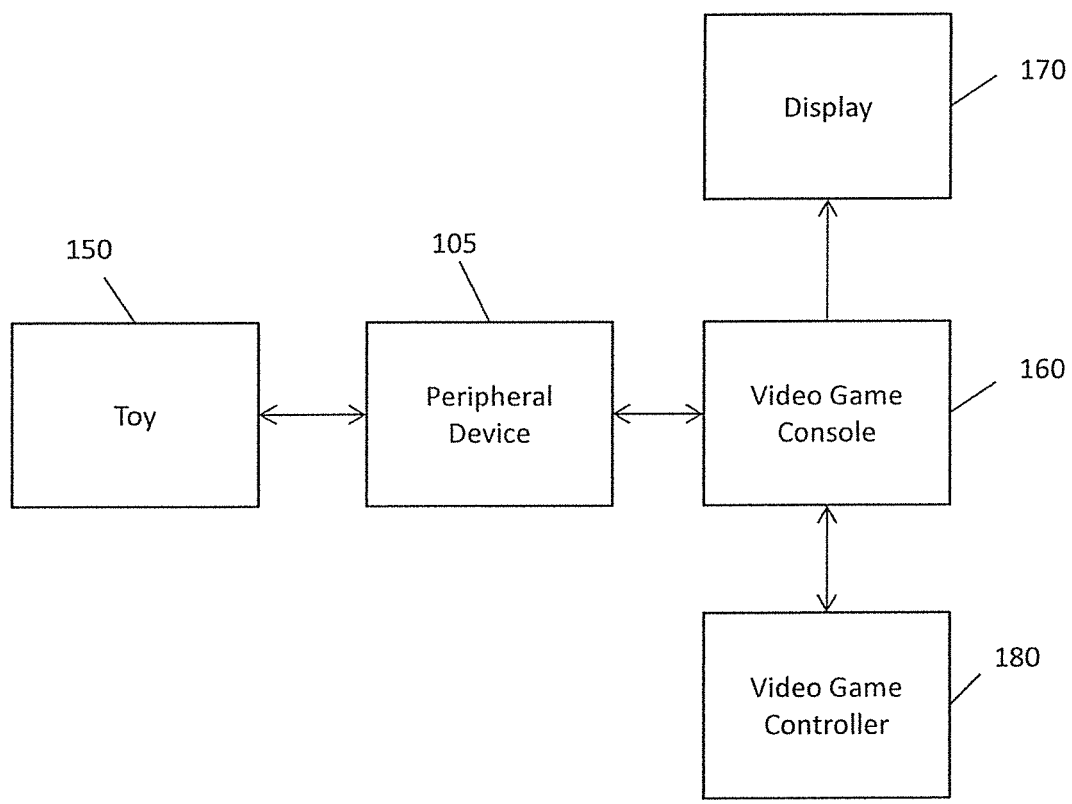
FIG. 1A is a block diagram illustrating an example of a video game system in accordance with aspects of the present invention.

FIG. 1A is a block diagram illustrating an example of a video game system in accordance with aspects of the present invention. Referring to FIG. 1A, the video game system includes a video game device in the form of a video game console 160 with a processor for executing program instructions providing for game play and associated circuitry, a user input device such as a video game controller 180, a display device 170, a peripheral device 105 and a toy 150. The toy 150 includes communication circuitry and a rewriteable data storage component (not shown in FIG. 1A), for example such as RAM or a rewritable RFID tag that stores data, for example, reflecting or writable to reflect information of a character or a plurality of characters within the game executed on game console 160. In some embodiments the information of the character is an identification of a character. In some embodiments information of the character includes information as to the characteristics, for example capabilities, of the character.

Although a video game console 160 is depicted, it is understood that in other embodiments the video game may be operated on other video game devices, for example a personal computer, mobile device (e.g. portable gaming device, cell phone, portable computer, tablet computer) or on a remote server or any other gaming platform alone or in combination with other devices in a system. Further, although FIG. 1A depicts a display 170 and video game controller 180 as separate components, it is understood that the in other embodiments one or more of these components may be integrated into a single or combination of devices.

In alternative embodiments, a peripheral device 105 is not needed. For example, in certain embodiments, toy 150 may communicate directly with the video game console 160. In still other embodiments, the video game controller 180 or display 170 may facilitate communication between the toy 150 and the video game console 160.

Figure 1B:
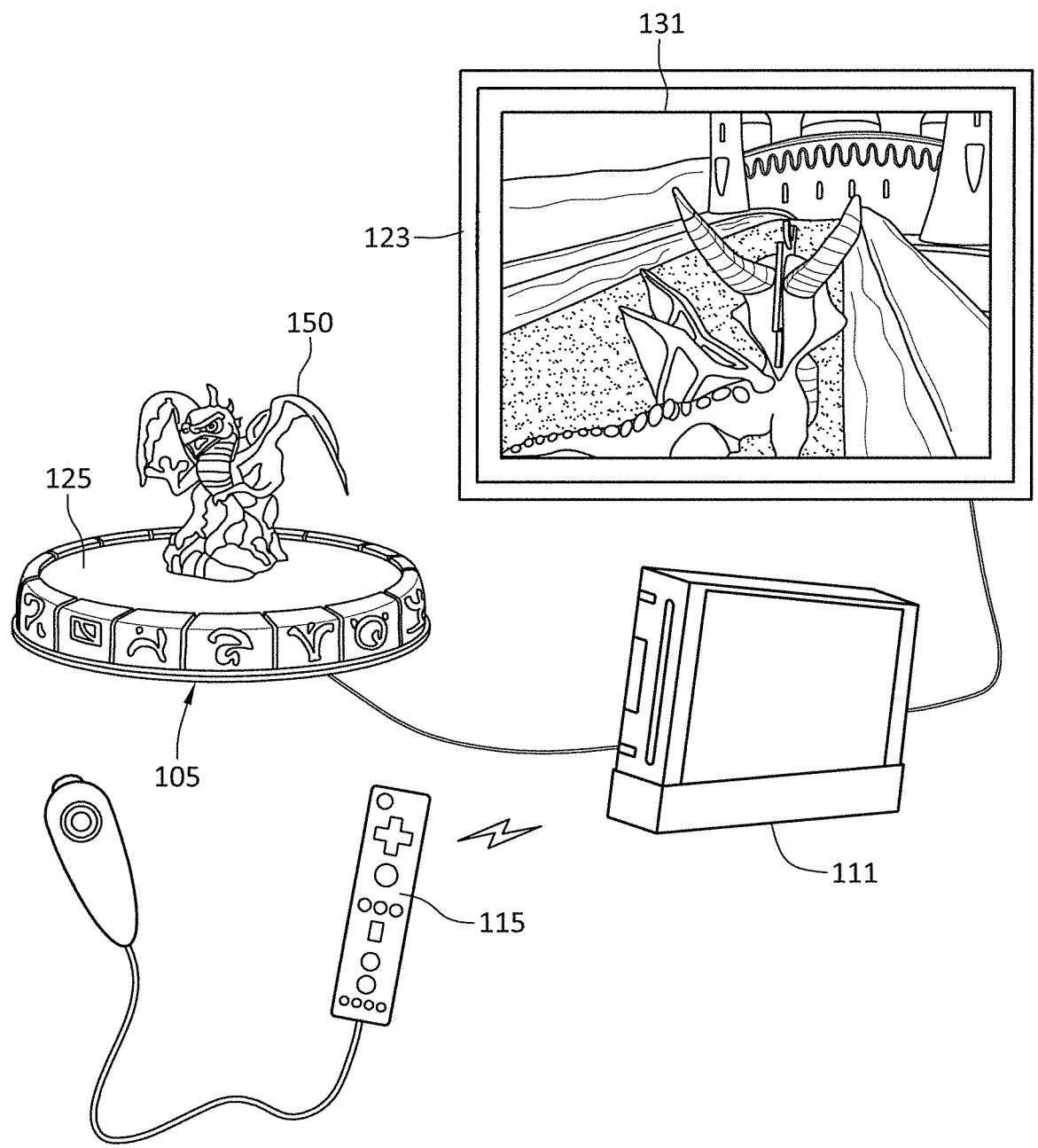
FIG. 1B illustrates an example of a video game system in accordance with aspects of the invention.

FIG. 1B illustrates an example of a video game system in accordance with aspects of the invention. The video game system includes a game console 111 with a processor for executing program instructions providing for game play and associated circuitry, user input devices such as a game controller 115, a display device 123 for displaying game action, a peripheral device 105, and a toy 150, which in various embodiments includes a rewritable memory. The peripheral device 105 may also provide the toy 150 with electrical power, for example through inductive couplings, although in some embodiments, the toy 150 may have its own source of electrical power, for example, a battery.

The peripheral device 105 may also provide the capability to read and write information to the toy 150. The processor, responsive to inputs from the user input devices and the peripheral device 105, generally commands display on the display device 123 of game characters in and interacting with a virtual world of game play and possibly each other. In addition, the processor, responsive to inputs from the peripheral device 105, for example inputs based on information read from the toy, may be used to add characters and objects to the virtual world, with the characters able to manipulate the added objects and move about the virtual world. For example, the processor may include characters in game play based on inputs from the peripheral device 105, and the processor may control actions and activities of game characters based on inputs from the user input devices. Furthermore, the processor, responsive to inputs from the peripheral device 105, may be used to change the characteristics, powers, and/or attributes of characters and objects in the virtual world. For example, a character in game play may have one or more characteristics, powers, and/or attributes associated with it, such as health, strength, power, speed, wealth, shield, weapons, special abilities, spells, or achievement level, for example. The processor may alter one or more characteristics, powers, and/or attributes associated with a character in response to inputs from the peripheral device 105.

The instructions providing for game play is generally stored on removable media, for example, an optical disk. Accordingly, the game console may include an optical drive, for example, a DVD-ROM, CD-ROM or Blu-ray drive, for reading the instructions for game play. In some embodiments, the removable media may be a flash memory data storage device. In some embodiments, the game console may be a personal computer, including similar internal circuitry as herein described, as well as, for example, a built-in display and built-in user input devices, such as a keyboard and a touch pad or mouse. In other embodiments, the instructions providing for game play may be stored in a remote server that is accessed by a computer or mobile device. In yet other embodiments, the instructions providing for game play may be stored on the local memory of the game console.

The display device 123 is generally coupled to the gaming platform by a cable, although in some embodiments a wireless connection may be used. In many embodiments, the display device is a liquid crystal display. In some embodiments, the display device is a television. In some embodiments, the display device is a cathode ray display, a plasma display, an electroluminescent display, an LED or OLED display, or other display. A display screen 131 of the display device 123 displays video images of game play, generally as commanded by the processor or other associated circuitry of the gaming platform. In the embodiment of FIG. 1B, the display screen shows a screen shot of video game play. As illustrated, the screen shot shows a display of a character, generally controlled by and animated in accordance with user inputs, approaching an inanimate item in the form of what may be considered a castle.

The peripheral device 105, in some embodiments and as shown in FIG. 1B, has a substantially flat upper surface 125 for placement of one or more toys thereon. The game player generally places game toys, for example, toy 150 as shown in FIG. 1B, on the flat surface 125 of the peripheral device during game play. In other embodiments, as shown in FIG. 2C, the upper surface may have a recess or slot for receiving toys.

Each toy 150 may include machine-readable/writable information, for example, memory or a radio frequency identification (RFID) tag. The machine-readable/writable information may be sensed, read, and/or written by the peripheral device 105 and/or the gaming device, directly or indirectly to the toy memory and/or tag. The machine-readable/writable information may include a numeric identifier. In some embodiments, the numeric identifier specifies a character from the video game that the user encountered or defeated while playing the video game. In other embodiments, the numeric identifier may specify other video game objects, such as accessories or weapons. In further embodiments, the machine-readable/writable information may also include game-related information including characteristics, powers, and/or attributes of characters that the user encountered or defeated while playing the video game, or information relating to game play achievements or events.

In some embodiments, when a toy memory or tag is read by the peripheral device 105, the peripheral device 105 provides the gaming platform an indication of the identifier and status information of the toy, and generally the processor of the gaming platform commands display of a corresponding game character or video game object, or otherwise makes the corresponding game character or video game object available in game play. In other embodiments, game-related information stored on the toy may be read and used by the processor to conduct a game play sequence. For example, characteristics, powers, and/or abilities of previously-defeated characters may be read and used by the processor to alter or enhance the user's character. In some embodiments, information relating to the user's character may be stored in a toy or object different from the toy or object that stores the information relating to the previously-encountered or defeated characters.

The toy 150 may include a rewritable memory. In various embodiments the rewriteable memory includes information of a game character. The user may place the toy 150 on the peripheral 105, and in some embodiments, the user may be allowed to place multiple toys on the peripheral 105. With the toy on the peripheral, the peripheral may read the information of the game character, and provide the information to the console 111, with the console inserting the character into game play. When a user plays the game on console 111, with the user controlling the character, for example by way of manipulation of a user input device, the user may encounter various challenges, such as enemies to be defeated by the character in a battle. If the user completes the challenge, for example, by controlling the character so as to destroy or beat the enemy in a battle, information of the defeated enemy character is written from the console 111 to the toy 150 via peripheral 105. In some embodiments, the information is data representing the identification of the defeated enemy character. In some embodiments, the information representing the defeated enemy character is written in place of information of the character played by the user. In some embodiments, the data representing the information of the defeated enemy character is written in addition to information of the character played by the user. In some embodiments, the information of the defeated enemy character is information identifying the defeated enemy character.

In subsequent gaming sessions, the user may place toy 150 on peripheral 105 and the data identifying the enemy character defeated in the prior gaming session may be transmitted to the console 111 via the peripheral 105. For example using a user input device, the user may then play with or control the enemy character identified in the toy 150 memory in the video game, or have that enemy character play alongside another character controlled by the user.

In some embodiments, the information relating to the character controlled by the user and the information identifying the defeated enemy character are stored in separate toys or objects. For example, toy 150 may be used to store information relating to one character controlled by the user, and another toy (not explicitly shown) may be used to store information relating to defeated enemy characters (or other characters/objects encountered during gameplay).

In some embodiments, the toy object 150 may only be capable of storing character identification information for a single character. In alternative embodiments, the toy object 150 may be capable of storing multiple character identifications. Although examples are provided in which information relating to a character is stored in toy object 150, in some embodiments, information relating to in-game objects may be stored instead or in addition. Examples of in-game objects include, without limitation, weapons, armor, potions, and any other object found in a particular video game.

Figure 2A:
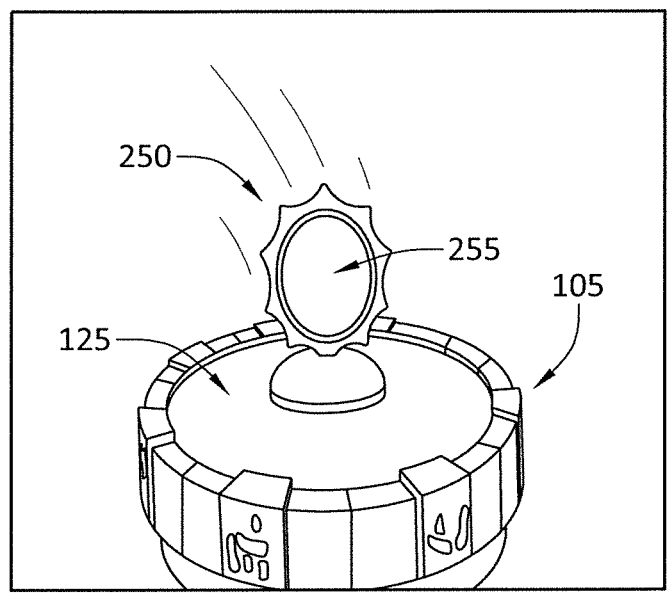
FIGS. 2A-2F illustrate examples of a toy and peripheral in accordance with embodiments of the invention.
Figure 2B:
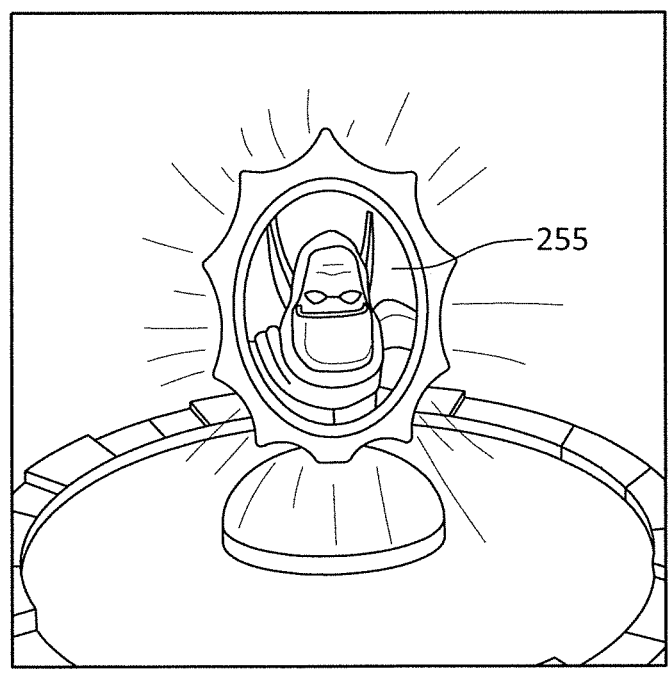
Figure 2C:
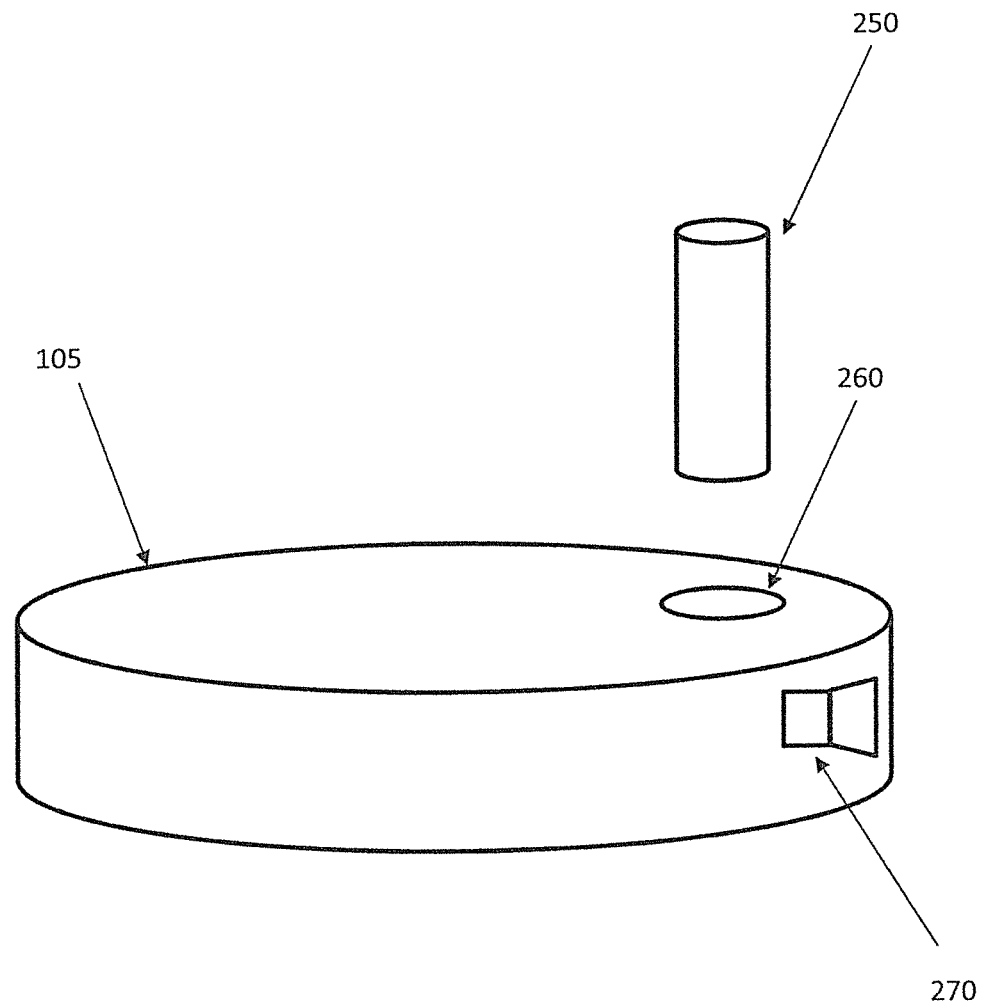

FIGS. 2A-2C illustrate embodiments of a toy 250 and peripheral 105 in accordance with aspects of the invention. Toy 250 is similar to toy 150 discussed above, for example including rewritable memory and communication circuitry. In various embodiments toy 250 may be used instead of or in addition to toy 150. As illustrated in FIGS. 2A and 2B, toy 250 may be placed on a top surface 125 of the peripheral device 105. In some embodiments, however, as shown in FIG. 2C and as discussed in more detail herein, toy 250 may be placed in other locations in relation to the peripheral, for example in a recess or slot in the peripheral's surface. In some embodiments, toy 250 may be placed in a location proximal to toy 150. For example, toy 250 may be in the shape of a weapon (e.g., a sword, shield, gun, cannon, bow and arrow, etc.) to be held by toy 150, or toy 250 may be in the shape of an item of clothing or some other accessory (e.g., hat, helmet, jacket, backpack, etc.) to be worn on toy 150.

As discussed in connection with FIG. 1B, toy 250 (and in some embodiments, peripheral 105) may be used to store information relating to characters and/or objects encountered in the virtual world. In some embodiments, toy 250 and/or peripheral 105 comprise audio and/or visual devices or outputs. For example, as illustrated in FIGS. 2A and 2B, toy 250 (and in some embodiments, peripheral 105) may include a display device 255. Display device 255 may comprise an LCD, electrophoretic ink, LED, a light projector, or other known display mechanisms. Additionally or alternatively, toy 250 and/or peripheral 105 may comprise visual outputs other than a display, for example lights internal to toy 250 and/or peripheral 105 (e.g., LED lights) and/or fluorescing or transparent portions illuminated by external light sources. Additionally or alternatively, toy 250 and/or peripheral 105 may comprise one or more audio devices or outputs, such as a loudspeaker. Additionally or alternatively, toy 250 and/or peripheral 105 may comprise one or more vibration motors for generating haptic feedback or other effects using vibrations.

In some embodiments, the audio/visual devices or outputs of toy 250 and/or peripheral 105 output human sensory perceivable information, for example audio/visual information, relating to the characters and/or objects stored on the toy and/or peripheral. The term "human sensory perceivable information" is used broadly and includes, without limitation, images, videos, spoken phrases, music, lighting effects, audio/sound effects, vibrations, haptic feedback, etc. For example, display device 255 (of the toy and/or the peripheral) may be activated or modified to depict an image of a defeated or captured character or object whose identification data was written to the memory on toy 250. In some embodiments, display device 255 may be activated or modified to depict or reflect other game-related information stored on toy 250. For example, display device 255 may display icons representing characteristics, powers, and/or abilities acquired from previously-encountered or defeated characters or objects. In embodiments comprising LED-based outputs, the LEDs may output colors representing characteristics, powers, and/or abilities acquired from previously-encountered or defeated characters or objects. For example, characters that have fire-based powers may be represented by a red LED output, while characters that have ice-based powers may be represented by a blue LED output.

In some embodiments, the audio devices and outputs of toy 250 and/or peripheral 105 may be used to output audio information reflecting or corresponding to the characters and/or objects whose identification is stored in the memory of the toy and/or peripheral, or the characteristics, powers, and/or attributes of characters and/or objects stored in the memory of the toy and/or peripheral. In some embodiments, the audio information may comprise words or phrases spoken in the voice of the characters stored in the memory of the toy and/or peripheral. In some embodiments, the audio information may comprise sounds corresponding to the characteristics, powers, and/or attributes of characters stored in the memory of the toy. For example, if the character whose information stored in the memory of the toy has characteristics, powers, and/or attributes relating to thunder, the audio information may comprise thunder sound effects.

In some embodiments, the audio/visual devices or outputs on toy 250 and/or peripheral 105 may be coordinated with gameplay events in the virtual world. For example, if the user defeats or otherwise captures a character and/or object during gameplay, the gaming platform may simulate the transfer of the captured character from the virtual world to the physical toy and/or peripheral by removing the captured character from gameplay and depicting the character (or a representation of the character) on the display device of toy 250 or peripheral 105 (and/or triggering some corresponding visual lighting effect on toy 250 and/or peripheral 105). Additionally or alternatively, the videogame may simulate sending the captured character from the virtual world to the physical toy 250 and/or peripheral 105 by coordinating the audio output from gameplay with the audio output from toy 250 and/or peripheral 105. For example, the gameplay may depict the captured character speaking or yelling and "hand off" (e.g., fade or switch) the character's audio from the gaming platform or main display device's audio output to the toy and/or peripheral's audio output. Similar coordination of audio/visual effects can be used to simulate bringing the captured character from the physical toy and/or peripheral back into the virtual world.

Another example of coordinating the audio/visual devices or outputs on toy 250 and/or peripheral 105 with gameplay events in the virtual world may include periodically (either at random or pseudo-random intervals or in response to gameplay events) using the audio devices on toy 250 and/or peripheral 105 to simulate audio of the captured character. For example, the audio devices on toy 250 and/or peripheral 105 may periodically output comments in the captured character's voice to simulate the captured character speaking from within the toy. In another example, audio representing the captured character may be output in response to gameplay events, for example, when the player's character and/or captured character sustains damage in the virtual world. Among other things, such coordination serves to increase the illusion of connection between the virtual and physical worlds, and reminds the player of the captured character's presence in the physical world.

Another example of coordinating virtual world gameplay events with the audio/visual devices or outputs on toy 250 and/or peripheral 105 comprises using the toy or peripherals LEDs to reflect virtual gameplay events. For example, the color of the LED output may be used to reflect the virtual character's health state (e.g., a green LED output may reflect good health state, a yellow LED output may reflect a medium health state, and a red LED output may reflect a poor health state). Additionally or alternatively, the LED output may pulse at different frequencies depending on the health of the character (e.g., the LED output may pulse more quickly as the character's health decreases or vice versa).

In some embodiments, the audio/visual information may be written from console 111 into memory of toy 250 and/or peripheral 105. In some embodiments, the audio/visual information may be completely written from console 111 into toy and/or peripheral memory before being output by the toy and/or peripheral's audio/visual output. In some embodiments, the audio/visual information may be streamed, or output while portions of the audio/visual information are still being written from console 111 into the toy and/or peripheral memory.

In some embodiments, toy 250 and/or peripheral 105 comprises a processor or control circuitry that is directly or indirectly in communication with console 111, which renders or otherwise processes the audio/visual information for output. In some embodiments, console 111 renders or otherwise processes the audio/visual information and drives the audio/visual output of the toy and/or peripheral (e.g., using a phone connector, component connector, RCA connector, etc.).

In some embodiments, the information may be transferred wirelessly from the console to the toy and/or peripheral using known wireless technologies (e.g., Bluetooth, WiFi, NFC, RFID, etc.). In some embodiments, the information may be transferred using a wired technology (e.g., USB, Firewire, etc.). In some embodiments, the toy and/or peripheral may store preloaded audio/visual information corresponding to various enemy characters or objects to be encountered. In some embodiments, and as discussed in the context of FIG. 4 below, the audio/visual information may be stored in a server accessible by console 111 through one or more networks.

In some embodiments, toy 250's audio/visual outputs may be activated both when toy 250 is in communication with the gaming platform and/or when toy 250 is not in communication with the gaming platform. In some embodiments, when toy 250 is in communication with the gaming platform, the audio/visual output may receive electrical power from the gaming platform, for example through inductive coupling, as discussed above. In some embodiments, the audio/visual output may receive electrical power from a source within toy 250 itself, for example, a battery.

In some embodiments, the audio/visual outputs are included only in one of toy 250 or peripheral 105. In embodiments where the audio/visual outputs are contained only in peripheral 105, peripheral 105's audio/visual outputs can be used to simulate that toy 250 contains the virtual character and/or object. For example, a lighting element of peripheral 105 may be used to illuminate a fluorescing or transparent portion of toy 250. Similarly, the audio output of peripheral 105 may be used to simulate audio emitted from toy 250. From a system perspective, it may be more cost effective to include the audio/visual outputs in a single peripheral instead of a potential multitude of toys.

In some embodiments, as shown in FIG. 2C, peripheral 105 includes a recess or slot 260 for receiving toy 250. The toy 250 also may be referred to as a game piece. A radio-frequency (RF) interface (not explicitly shown) may be positioned proximal to recess 260 to communicate with toys placed in recess 260. In some embodiments, peripheral 105 comprises a plurality of RF interfaces for communicating with a plurality of toys. For example, there may be a first RF interface proximal the center of peripheral 105 for communicating with toys placed on peripheral 105's surface and a second RF interface for communicating with toys placed in recess or slot 260 of peripheral 105. In other embodiments, peripheral 105 may comprise a single RF interface for communicating both with toys on the peripheral 105's surface and toys placed in recess or slot 260. In embodiments with a single RF interface, peripheral 105 may further comprise an antenna proximal to recess 260 that is electronically coupled (using a wireless or wired interface) to peripheral 105's RF interface for relaying signals from peripheral 105's RF interface to the RF interface of a toy in recess 260 (or vice versa). In some embodiments, the antenna proximal to recess 260 may share a resonant frequency with an antenna of toy 250. In many embodiments, the RF interface(s) comprise radio frequency identification (RFID) interfaces (although other interfaces, such as optical interfaces or wired interfaces, may be used).

Figure 2D:
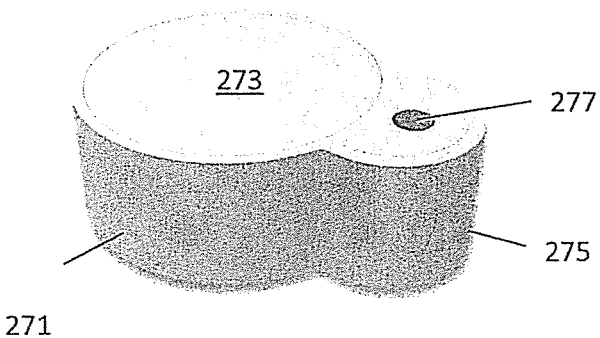

FIG. 2D is a perspective view of a further peripheral in accordance with aspects of the invention. The further peripheral of FIG. 2D is includes a housing with a first lobe 271 and a second lobe 275. The first lobe is illustrated as cylindrical in form, with a substantially flat top 273 coupled to a substantially flat bottom by cylindrical sidewalls. The top 273 may be used for placement of toys, for example as previously discussed.

The second lobe is of a generally cutaway cylindrical form, with the second lobe extending from what would otherwise (in the absence of the second lobe) be an exposed sidewall of the first lobe. A top of the second lobe is coplanar with the top of the first lobe, as is a bottom of the second lobe with the bottom of the first lobe.

The second lobe includes a cavity 277, which also may be referred to as a trap. The cavity may be used for insertion of game pieces with lower portions of a shape suitable for insertion into the trap.

Figure 2E:
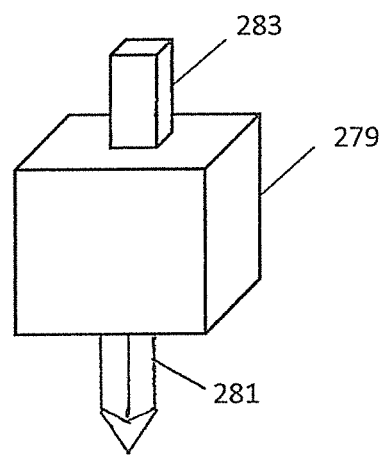

FIG. 2E is a perspective view of an example game piece with a lower portion 281 suitable for insertion into the trap. The game piece includes a body 279, from a bottom of which the lower portion 281 extends. In the embodiment of FIG. 2E the lower portion is in the form of a spike-like protrusion. An upper portion 283 extends from an upper surface of the body. Of course, in various embodiments the body and the head may be replaced, together or separately, with a variety of shaped structures, and the shaped structures may take the form of a variety of items, whether real or fantastical, representing inanimate objects or animate beings.

In some embodiments the lower portion, or parts thereof, are translucent to light, as are at least parts of the body. The parts of the lower portion translucent to light preferably include part of its exterior surface, and a portion allowing transmission of light through the lower portion to the body. Similarly, the parts of the body translucent to light preferably include parts to allow transmission of light from the lower portion to an exterior surface of the body, also translucent, or to the head, if the head includes translucent portions. Presence of the translucent portions allows exterior surfaces of the game piece, or some part thereof, to be visibly illuminated by light when light is applied to the lower portion.

Figure 2F:
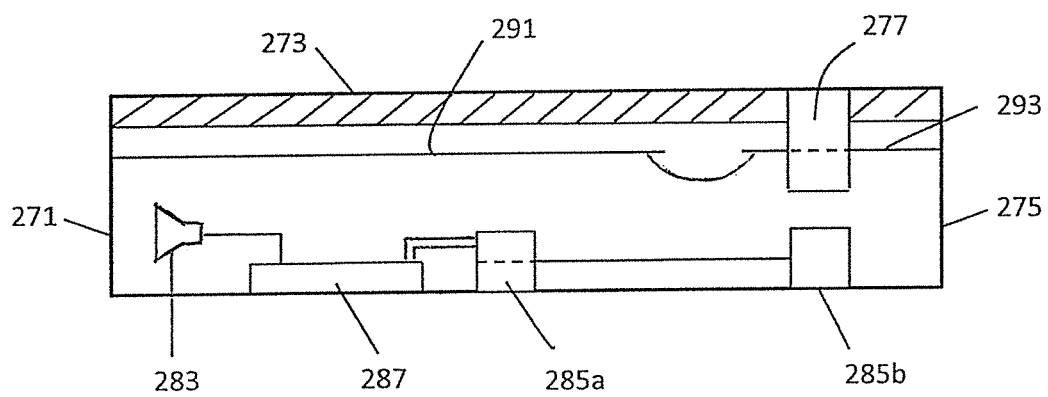

FIG. 2F illustrates a form of a cross-section of the peripheral of FIG. 2D. As indicated above, the peripheral includes a first lobe 271 and a second lobe 273, although the peripheral may take a variety of shapes in various embodiments, including but not limited to a ring, hexagon, or pentagon. In some embodiments, the peripheral includes a substantially flat top 273 for placement of toys thereon, with a trap 277 extending inward into the peripheral from the top 273. A first antenna 291 is under, and approximate, the flat top, with the antenna positioned so as to be able to wirelessly communicatively link the peripheral and toys with appropriate electronics on the flat top. A second antenna 293 is placed about the trap 277, so as to be able to wirelessly communicatively link a game piece, with appropriate electronics, at least partially inserted into the trap, with the peripheral. The antennas are coupled by wires to a circuit board 287 within the trap, with the circuit board providing for communications functions and other functions. In the embodiment of FIG. 2D, the second antenna is linked by a wire, or other electrically conducting item, to the first antenna, which in turn is electrically coupled to the circuit board. In other embodiments the reverse is true, and in some embodiments both antennas are individually electrically coupled to the circuit board. In some embodiments, the surface for placing toys may be at the base or a mid-portion of the peripheral. In some embodiments, no surface may be present, and the region for placing toys may be spatially delineated, for example, the area encircled by the sidewalls of the peripheral.

A speaker 283 for generating audio is within the peripheral. As illustrated in FIG. 2F the speaker is positioned away from the second lobe, although in various embodiments position of the speaker may be elsewhere, for example within the second lobe. The speaker may be driven, for example, by electronics of the circuit board.

The peripheral also includes light sources 285a,b, for example LED light sources, within the peripheral. The light sources may be driven by electronics of the circuit board. In the embodiment of FIG. 2F, one light source is shown within the first lobe, and a second light source is shown in the second lobe, under the trap so as to be able to illuminate a lower portion of a game piece within the trap. Accordingly, a bottom surface of the trap is translucent, in some embodiments, or the trap may have no bottom surface at all, allowing for passage of light into the game piece. In some embodiments the top of the peripheral, or portions thereof, may be translucent to light, allowing for visual effects from the peripheral and/or passage of light to the game piece, even in embodiments in which the bottom of the trap is not translucent.

Figure 3:
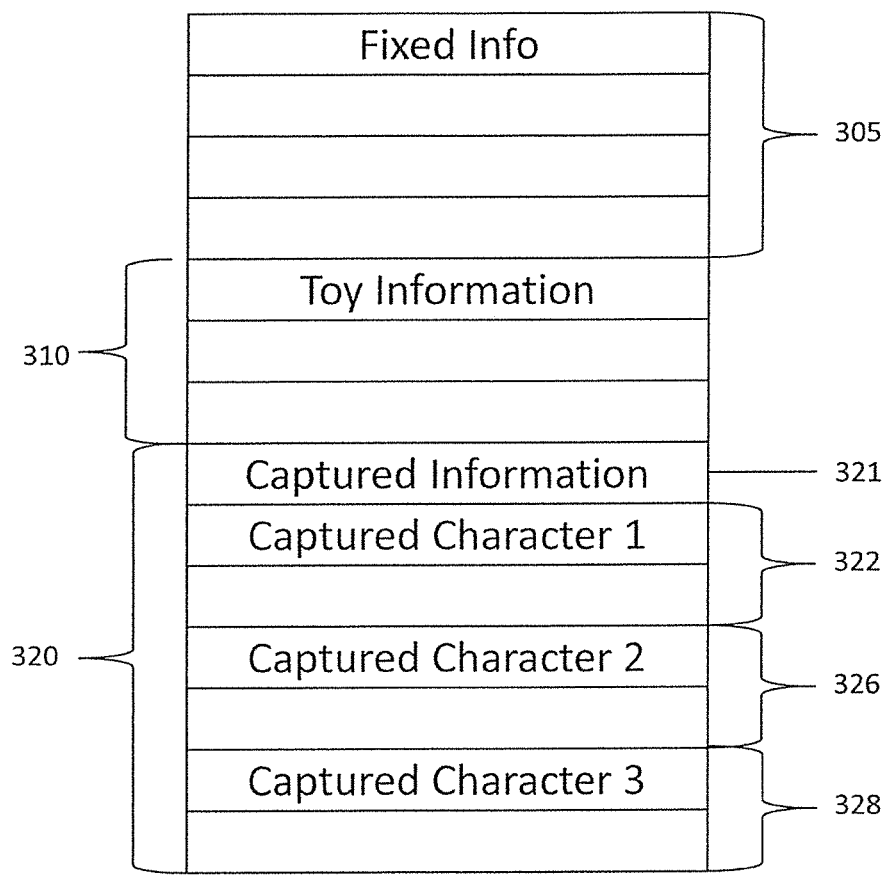
FIG. 3 is a diagram of an example data structure for storing character information in memory of a toy in accordance with aspects of the invention.

FIG. 3 is a diagram of an example data structure for storing character information in memory of a toy in accordance with aspects of the invention. Information about characters such as their identification, characteristics and/or status, may be stored at various locations in the data structure. Although various fields of the data structure are shown in particular locations in FIG. 3, the data structure may use a different arrangement of the fields, and may only include subsets of fields or information of the fields.

The data structure includes an area of fixed information 305. The fixed information may include information that identifies a type of toy and a particular instance of the toy, for example, the fixed information may include a 32-bit serial number. The fixed information may also include an identification of objects related to the toy, such as an identification of a trading card. The fixed information generally includes a field for data verification, for example, a cyclic-redundancy check value or check sum. The fixed information is generally written when the toy is created and not thereafter changed.

The data structure of FIG. 3 also includes a toy data area 310 and a captured data area 320. In some embodiments only certain toys, or game characters representative of the toys, may be used for capturing characters. In some embodiments a toy, such as toy 150 and/or 250, may contain both the toy data area and the captured data area. In some embodiments a toy may contain only a toy data area or a captured data area, but not both. In some embodiments some toys may contain both data areas, some toys may contain only the toy data area, and some toys may contain only the captured data area. In some embodiments toys may include both the toy data are and the captured data area, but flags, in memory of the toy for example, may indicate for which areas data may be written, or not written. The toy data area contains fields for values representing information about a game play object or character represented by the toy. In some embodiments the information about the game play object or character that may change during game play. For example, if a character is represented by the toy, fields that store score values, experience levels, or other information of the character may change frequently during game play.

A captured character may be another game character encountered or defeated in battle, whose identity of characteristics may be "captured" by a game character during game play. In some embodiments the captured data area includes fields for information of a single captured character, and in some embodiments, such as illustrated in FIG. 3, the captured data area includes fields for information for a plurality of captured characters. In some embodiments the information for a captured character is an identifier for the captured character. In some embodiments the information for the captured character may change during game play. For example, fields that store score values, experience levels, or other information of the captured character may change during game play, as a result of game play in which a user utilizes the captured character or otherwise. In some embodiments the information for the captured character includes information of an image of the captured character and/or information as to capabilities, characteristics or other information regarding the captured character. In some embodiments the information of the image is in the form of a bitmap. In some embodiments, the information for the captured character includes audio information reflecting or corresponding to the captured character or characteristics, powers, and/or attributes of the captured character.

As illustrated in FIG. 3, the captured data area includes a header field 321 for captured character information. Information of the header field may indicate, for example, the number of captured characters for which information is stored. The captured data area also includes first captured character information fields 322, second captured character information fields 326, and third captured character information fields 328.

Figure 4:
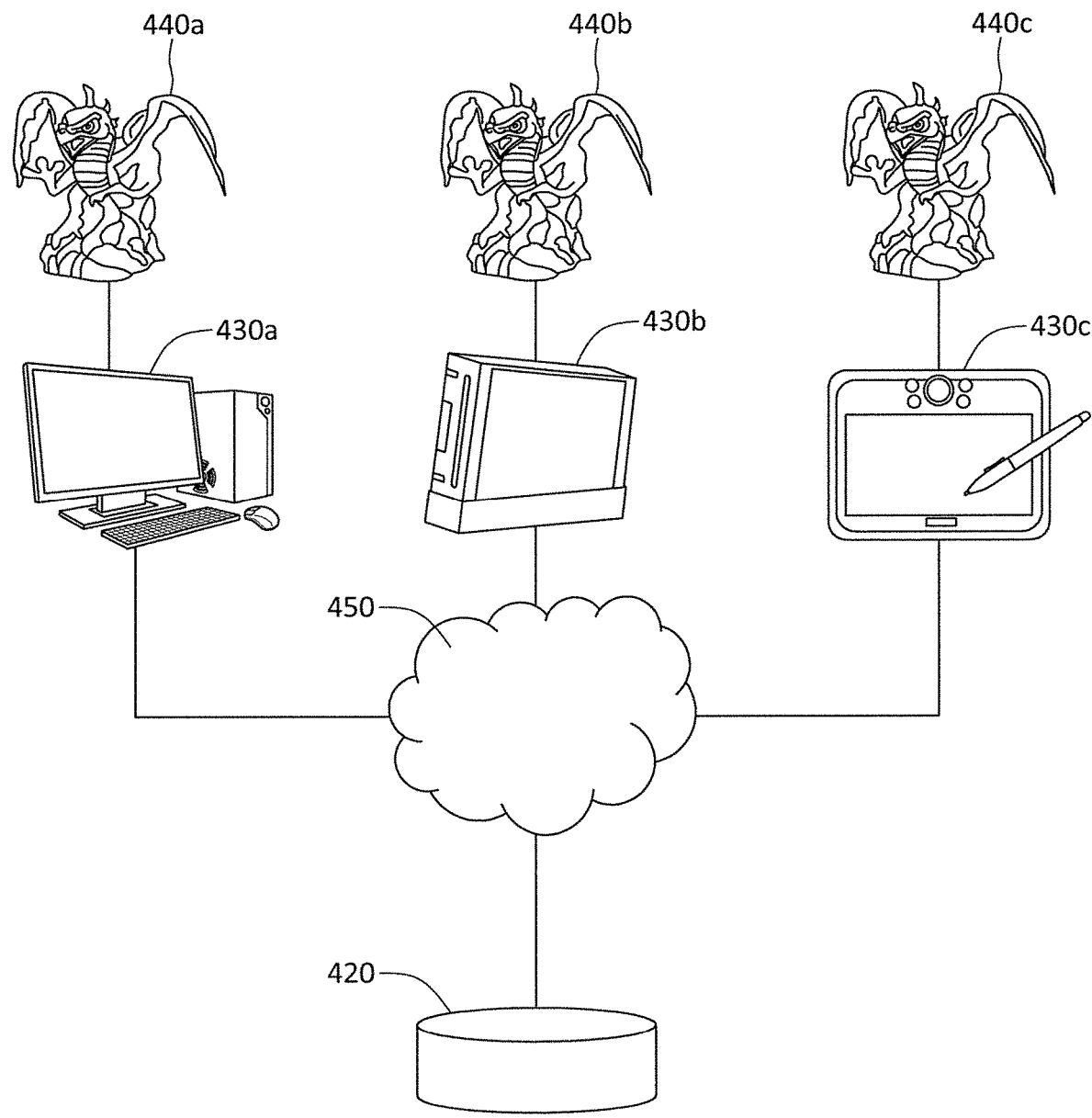
FIG. 4 is a block diagram of a system in accordance with aspects of the present invention.

Referring to FIG. 4, an embodiment of a system in accordance with aspects of the present invention includes one or more gaming platforms 430a-c each with a processor for executing program instructions providing for game play and associated circuitry (such as I/O devices and display devices, not shown) connected to a server 420 (or plurality of servers) through a combination one of more wired or wireless networks 450. The gaming platforms 430 may be any of a variety of processing devices capable of executing a video game program and communicating with a remote server, such as a traditional video game console (e.g. PlayStation, Xbox, Wii, WiiU), portable game console (e.g. Nintendo NDS, PlayStation Portable), a personal computer, a laptop, a mobile computing device (e.g. iPad or other tablet), or other mobile device (e.g. cell phone, iPhone, Blackberry, Android operated phone, MP3 player, portable media player). The platforms provide video images to a display. The platform may also provide audio outputs.

In one embodiment, the gaming platforms 430a-c are each able to uniquely identify one or more toys 440a-c. The identification of toys 440a-c may be performed either through a direct or indirect coupling between toys 440a-c and the gaming platforms 430a-c. For example, the coupling may be through a wired connection (e.g. USB), a wireless coupling (e.g. NFC, Bluetooth, or Wi-Fi), or other known object recognition methods, such as recognizing toys 440a-c by capturing a visual image of the toy and determining identity, or by scanning a bar code or other code printed on toys 440a-c or on a separate medium associated with toys 440a-c. In other embodiments, the gaming platforms 430a-c are able to identify toys 440a-c via a peripheral coupled to platforms 430a-c.

In some embodiments, once a gaming platform 430a-c recognizes and identifies toys 440a-c, a virtual representation of toys 440a-c is presented in a game operating on gaming platform 430a-c. The user may control the virtual representation of the toys 440a-c within the game. The virtual representation of toys 440a-c may have an identity and/or one or more characteristics, powers, and/or attributes associated with it, such as health, strength, power, speed, wealth, shield, weapons, special abilities, spells, or achievement level, for example. As the user plays the game utilizing, at least in part, the virtual representation of the toys 440a-c, the identity and/or one or more characteristics, powers, and/or attributes associated with toys 440a-c may be altered.

For example, when a user, by way of utilization of the virtual representation of the toy, encounters or defeats an enemy character, information of the encountered or defeated character may be stored in the memory of the toy or server 420. In some embodiments the information of the encountered or defeated character comprises the identity of the encountered or defeated character. In some embodiments the information of the encountered or defeated character additionally comprises characteristics of the encountered or defeated character. In some embodiments a game console may command storage of the information of the defeated or encountered character, for example as requested by the user. As another example, as the user progresses through different challenges within the game using the virtual representation of toys 440a-c, the user may effectively acquire use of characteristics, powers, and/or attributes from defeated characters, or discover and collect various virtual items, such as a weapon, usable by the virtual representation of toy 440a-c within the virtual world. In some embodiments, at the completion of a particular gaming session, or periodically throughout a gaming session, the changes in identity and/or characteristics, powers, and/or attributes to the virtual representation of toy 440a-c are stored by gaming platform 430a-c to server 420. The identity and/or characteristics, powers, and/or attributes data is stored on said server 420, for example via a relational database, and is associated with the particular toy 340a-c for subsequent access by the user utilizing toy 440a-c in subsequent gaming sessions either on the same or different gaming platforms. Accordingly, the updated data pertaining to the one or more characteristics and/or attributes associated with the virtual representation of toy 440a-c may persist across platforms having access to server 420. In some embodiments, these attributes may also be stored elsewhere, such as a memory associated with gaming platform 430a-c or a memory associated with toy 440a-c.

Still in reference to FIG. 4, in some embodiments, the video game may be played in a multiplayer mode comprising a plurality of users, each using one or more toys 440a-c substantially in the manner described above, playing the video game locally, over a network, or a combination thereof. Network-based multiplayer games may be facilitated through a centralized server, such as server 420, or through peer-to-peer connections.

In multiplayer mode, the memories of a first user's and a second user's toys may be written in connection with game play events involving characters associated with the first user's and second user's toys. For example, when a character controlled by the first user defeats a character controlled by the second user, the first user's game console may write, through the first user's peripheral device in some embodiments, an identification of the character controlled by the second user to the memory of one of the first user's toys. The first user's toy may then store the written data in the toy's memory and that written data may be used in subsequent gaming sessions by the first user. For example, in some embodiments, the first user may then play with the second user's character identified in the first user's toy memory, or have the second user's character play alongside another character controlled by the first user. In other embodiments, one or more characteristics, powers, and/or attributes of the second user's character may be written to the first user's toy, thereby allowing the first user's character to acquire said characteristics, powers, and/or attributes. In some embodiments, the benefits of defeating the second user's character may be temporary. For example, after a predetermined amount of time (e.g., 30 seconds, 5 minutes, 1 hour, 1 day, etc.), the first user will automatically lose the ability to play with the second user's character or the enhanced characteristics, powers, and/or attributes gained from defeating the second user's character.

Still referring to the multiplayer embodiment, the second user's game console may also write through the second user's peripheral device information reflecting the game play event to the memory of one of the second user's toy. For example, following a defeat at the hands of the first user, game-related information reflecting this defeat may be written to the second user's toy. The second user's toy may then store the written data in the toy's memory and that written data may be used in subsequent gaming sessions by the second user. For example, in some embodiments, characteristics, powers, and/or attributes of the second user's character may be altered or decreased to reflect that these characteristics, powers, and/or attributes have been acquired by the first user's character. In some embodiments, and in accordance with the discussion above, these effects are temporary.

Figure 5:
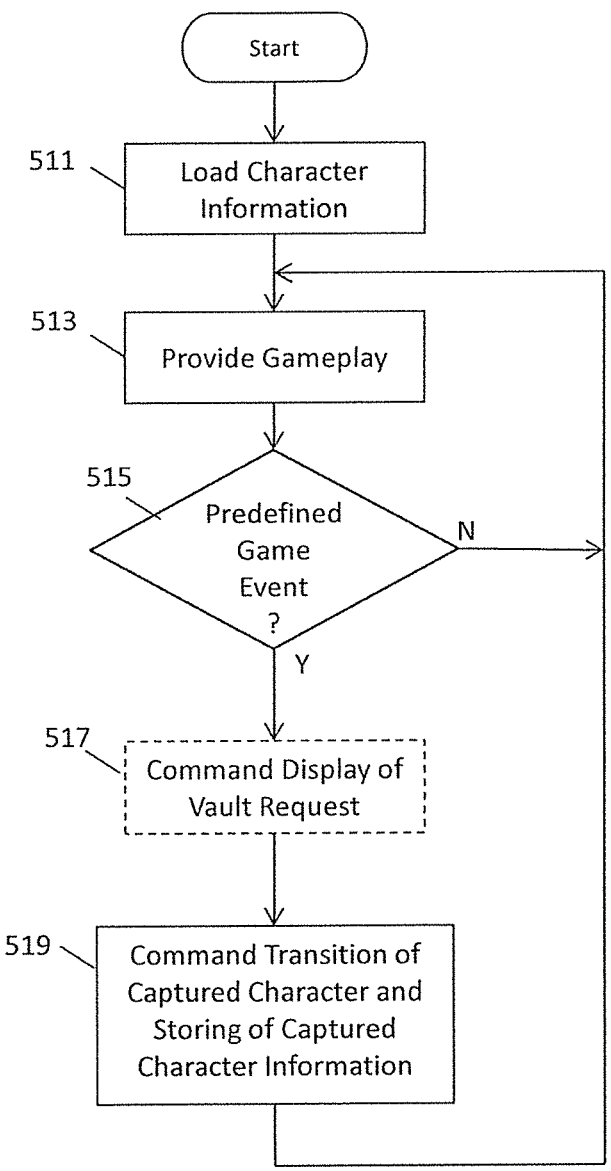
FIG. 5 is a flowchart of a process including storing of captured characters in accordance with aspects of the invention.

FIG. 5 is a flow diagram of a process including storing of captured characters. In some embodiments the process of FIG. 5 is performed by the system of FIG. 1A or 1B. In some embodiments the process is performed by a processor programmed by program instructions for example a processor of a game device such as a game console.

In block 511 the process loads character information. The character information may be stored in memory of a toy, and read from the memory of the toy and stored in memory of the game device. In block 513 the process provides for game play of a video game. In most embodiments providing for game play includes commanding presentation of at least portions of a virtual world of game play on a display, including a game character based on the character information and possibly other game characters, and modifying game states based on video game play, including inputs received from a user input device.

In block 515 the process determines if a predefined game event has occurred. In some embodiments the predefined game event is defeat of an opposing game character by the game character. In some embodiments the opposing game character is a game character controlled by another user. In some embodiments the opposing game character is a character controlled by game program instructions of the video game.

If the predefined game event has occurred the process proceeds to optional block 517 or block 519, otherwise the process returns to block 513 and continues to provide for game play.

In optional block 517 the process commands display of an indication to the user regarding storage of information of the opposing game character. In some embodiments, for example, information of the opposing character may be stored in a separate toy, for example a game piece such as discussed with respect to FIGS. 2C-F, and the indication may effectively ask the user to communicatively couple the separate toy to the game. In some embodiments the indication may be a request to the user to indicate whether storage of the information of the opposing character is desired. In some embodiments the indication may indicate that information of the opposing character is being stored. As operations of block 517 are optional, however, in some embodiments the process skips the operations of block 517, and instead continues to block 519.

In block 519 the process commands storage of the opposing game character information. In some embodiments the process commands storage of the opposing game character information on a server. In some embodiments the process commands storage of the opposing game character information in memory of a toy, for example a game piece. In some embodiments the opposing game character information is an identifier identifying the opposing game character.

In some embodiments, the storage of the opposing game character information may be accompanied by corresponding game play events and/or audio/visual events. For example, when the process commands storage of game character information to the memory of a toy, the process may simulate the transfer of the game character from the virtual world to the physical world using game play events and/or audio/visual events as described above in connection with FIGS. 2A-2C.

In some embodiments, and as referenced in FIG. 5, the process commands a simulated transition of the captured character from an audiovisual presentation provided by a video game console and display to an audio, visual, or audiovisual presentation provided by a peripheral and, in some embodiments, game piece. In some such embodiments audio and/or visual presentation of the game character on the display may cease, replaced with audio or visual presentation provided by the peripheral and/or game piece. In some embodiments the audio presentation provided by the peripheral may be utterances in a voice of the opposing game character, or a generic audio presentation, for example a wail of despair. In some embodiments the visual presentation may be lighting of translucent parts of a game piece, for example by way of light sources within the peripheral. In some embodiments an audio presentation associated with the display may decrease in volume until inaudible, while an audio presentation associated with the peripheral increases for a period of time, for example representing a transition of the opposing game character from the display to the game piece. Similarly, in some embodiments, a visual display of the opposing character on the display may fade away, while lighting of the game piece may increase in intensity for a period.

The process thereafter returns.

Figure 6:
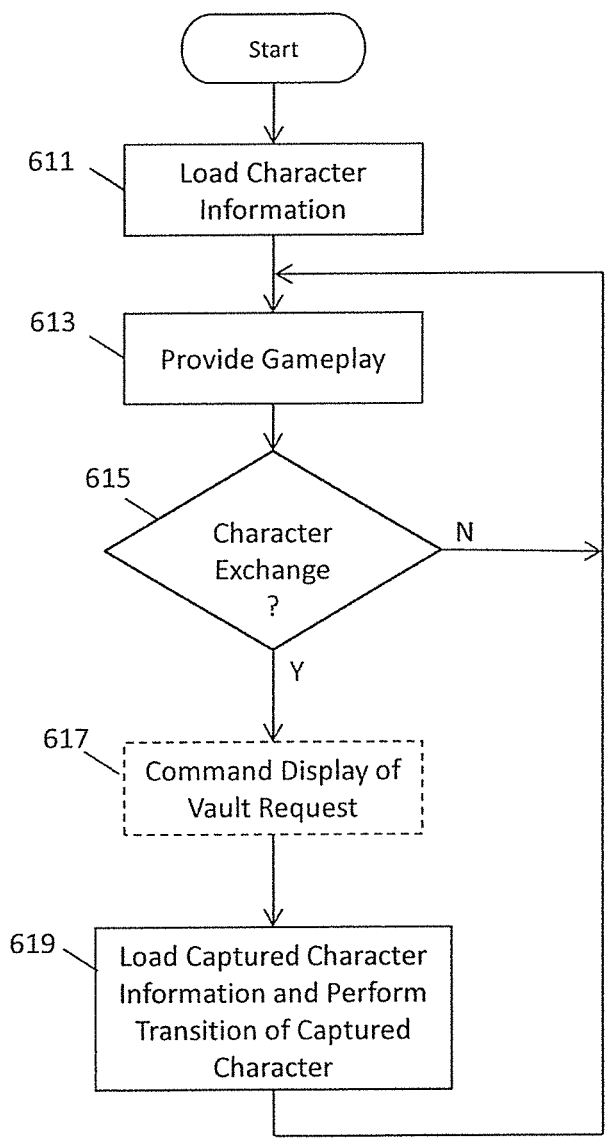
FIG. 6 is a flowchart of a process including loading captured character information for use during game play.

FIG. 6 is a flow diagram of a process including loading captured character information for use during game play. In some embodiments the process of FIG. 6 is performed by the system of FIG. 1A or 1B. In some embodiments the process is performed by a processor programmed by program instructions for example a processor of a game device such as a game console.

In block 611 the process loads character information. The character information may be stored in memory of a toy, and read from the memory of the toy and stored in memory of the game device. In block 613 the process provides for game play of a video game. In most embodiments providing for game play includes commanding presentation of at least portions of a virtual world of game play on a display, including a game character based on the character information and possibly other game characters, and modifying game states based on video game play, including inputs received from a user input device.

In block 615 the process determines if a user has requested a change in characters to a captured character, for example by operating the user input device or by placement of a particular toy on a peripheral device. If not, the process continues providing game play in block 613. If so, the process continues to optional block 617 or block 619.

In optional block 617 the process commands display of an indication to the user as to actions to take in order to effect a change in characters. For example, the process may command display of an indication for the user to place a particular toy on a peripheral device of a game system.

In block 619 the process loads the information for the captured character. In some embodiments the process reads the information stored in memory of a toy. In some embodiments the process downloads the information from a server. In some embodiments the information identifies the captured character, and the process determines other information regarding the captured character from memory of the game console.

In some embodiments, the loading of information for the captured character may be accompanied by corresponding game play events and/or audio/visual events. For example, when the process commands loading of information for the captured character, the process may simulate the transfer of the game character from the physical world to the virtual world using game play events and/or audio/visual events as described above in connection with FIGS. 2A-2C.

In some embodiments, and as referenced in FIG. 6, the process commands a simulated transition of the captured character from an audiovisual presentation provided by a peripheral and, in some embodiments a game piece, to an audio, visual, or audiovisual presentation provided by a video game console and/or display. In some such embodiments audio and/or visual presentation provided by the peripheral and/or game piece may cease, replaced with an audiovisual presentation of the captured character on the display. In some embodiments the audio presentation provided by the peripheral may be utterances in a voice of the captured game character, or a generic audio presentation, for example an enthusiastic yell. In some embodiments the visual presentation may be lighting of translucent parts of a game piece, for example by way of light sources within the peripheral. In some embodiments an audio presentation associated with the peripheral may decrease in volume until inaudible, while an audio presentation associated with the display increases for a period of time, for example representing a transition of the captured game character from the game piece to the display. Similarly, in some embodiments, a lighting of the game piece by the peripheral may fade away, while visual presentation of the captured game character may increase in intensity for a period.

The process thereafter returns to block 613 and provides game play, with the user using the user input device to control the captured character. In some embodiments the captured character may be utilized as other game characters are utilized, for example the game character discussed with respect to operations of block 613. In most embodiments attributes of such characters may change during game play. For example, a value indicative of health of the character may increase or decrease, or the character may increase or decrease in levels, or the character be upgraded in some manner. In such embodiments, revised information of the captured character may be written to memory of the toy, or provided to a server.

Figure 7:
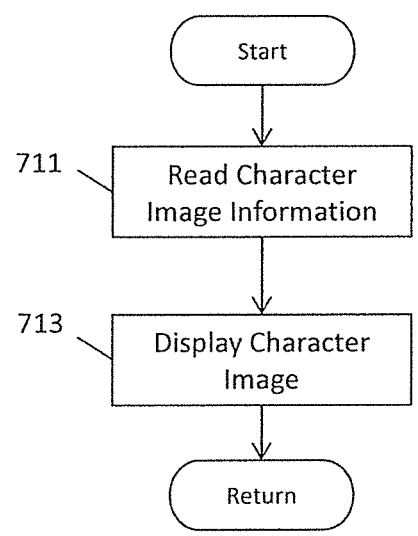
FIG. 7 is a flowchart of a process for displaying character information on a toy.

FIG. 7 is a flow diagram of a process for displaying character information on a toy. In some embodiments the character information is an image of the character. In some embodiments the image is of a captured character. In some embodiments the character information is images of a plurality of captured characters. In some embodiments the process is performed by a toy, for example the toy of FIGS. 2A and 2B, and in some embodiments the process is performed by circuitry of the toy, and the circuitry may be in the form of a programmable processor in some embodiments.

In block 711 the process reads character information. In some embodiments the character information is read from memory of the toy. In some embodiments the character information is image information, and in some embodiments the image information is a bit map of an image.

In block 713 the process commands display or displays the character information on a display of the toy. For example, in some embodiments a view of a face of the character is displayed.

Figure 8:
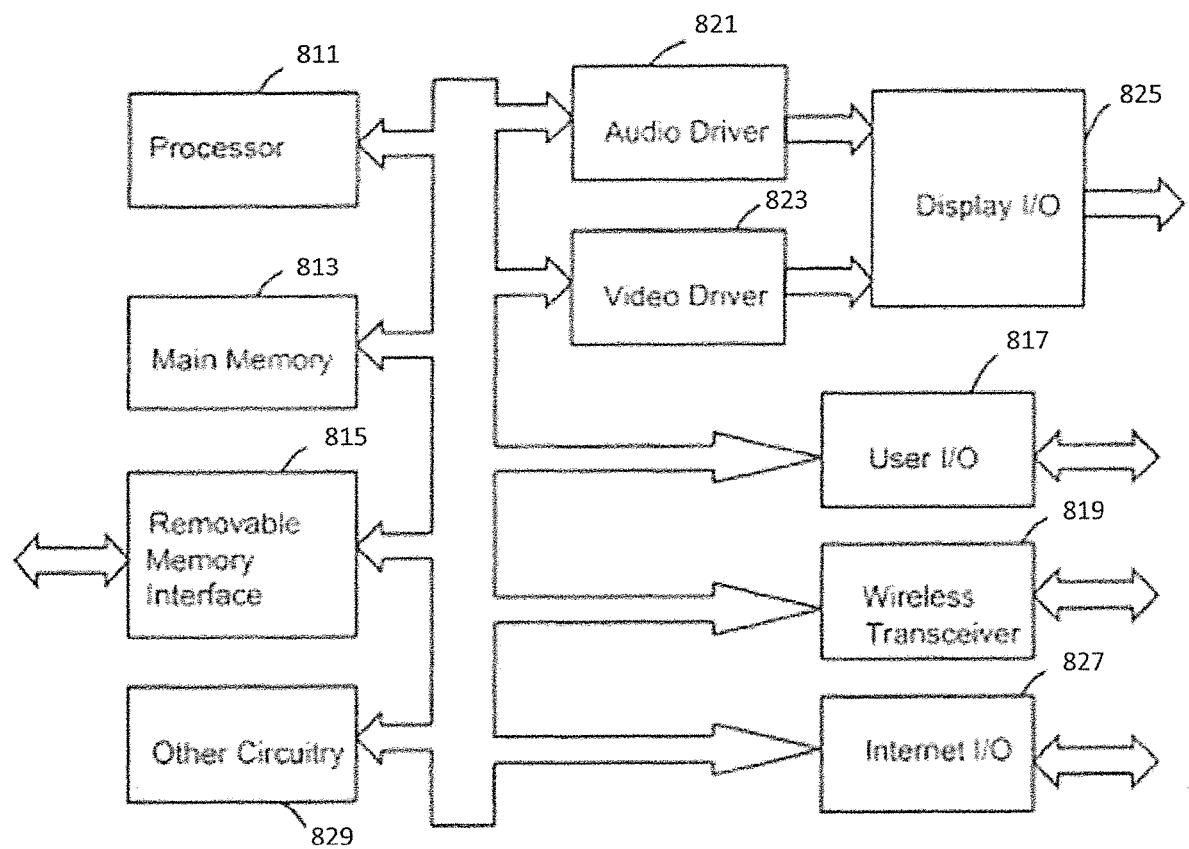
FIG. 8 is an example of a block diagram of a processor and associated circuitry for a device useful in accordance with aspects of the invention.

FIG. 8 is an example of a block diagram of a processor and associated circuitry, for example, for a game device, useful in accordance with aspects of the invention. As shown in FIG. 8 a processor 811 is connected to other components via a bus. The other components include a main memory 813 and a removable memory interface 815 generally coupled to a removable memory device, for example, a DVD-ROM drive. The processor may execute instructions retrieved from the removable memory device to control game play and store game state information in the main memory. For example, the instructions may be for determining possible movements, positions, and locations of a game character.

The processor is coupled to an audio driver 821 and a video driver 823. The audio driver produces sound signals and the video driver produces image signals. The sound signals and image signals are transmitted from the game console via a display I/O device 825. The display I/O device generally supplies the sound and image signals to a display device external to the game console. Sound signals may also be supplied to a peripheral device such as a toy detection device.

The processor may also be coupled to a user I/O device 817, a wireless transceiver 819, an Internet I/O device 827, and other circuitry 829. The user I/O device may receive signals from a toy reader and/or signals from a keyboard, a mouse, and/or a game controller, with generally the keyboard, mouse, and/or controller being used by a user and providing user inputs, for example, during game play. Alternatively or additionally, the game console may receive user inputs via the wireless transceiver. The Internet I/O device provides a communication channel that may be used, for example, for multiple player games.

Figure 9:
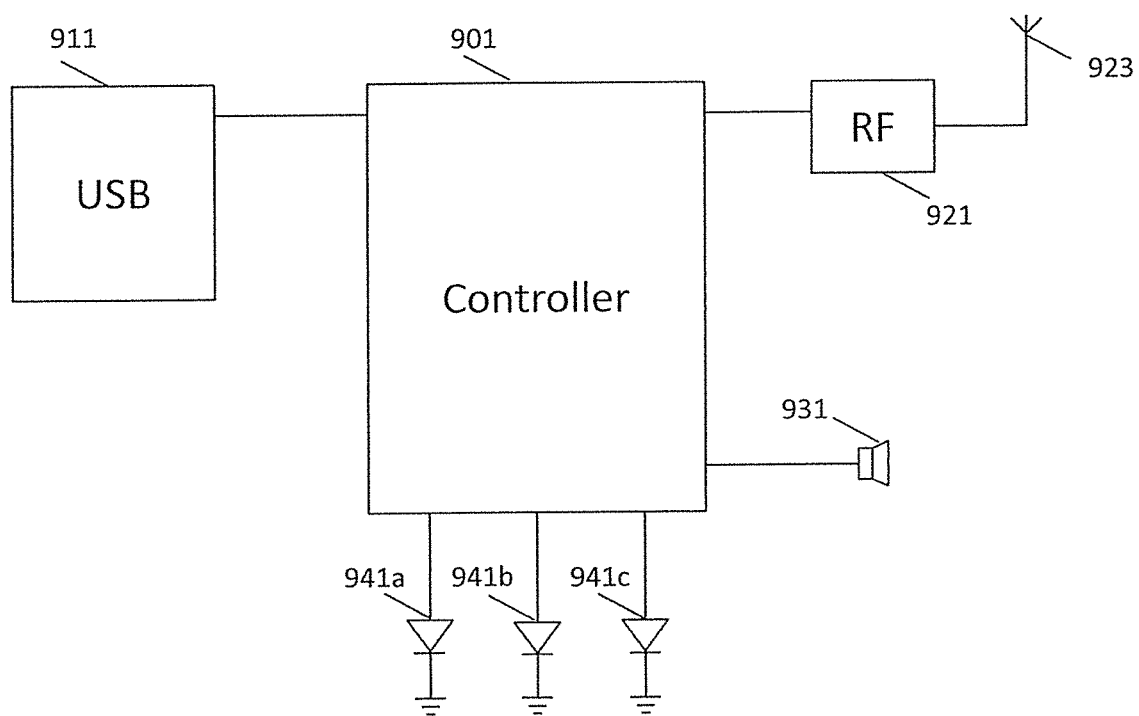
FIG. 9 is a block diagram of a video game peripheral in accordance with aspects of the invention.

FIG. 9 is a block diagram of a video game peripheral in accordance with aspects of the invention. The peripheral may be used in some embodiments to detect toys placed thereon. The peripheral may be used to provide information from the toy to a game console and, in some embodiments, from the game console to the toy or from one toy to another toy. Accordingly, the peripheral includes a universal serial bus (USB) interface 911 to communicate with the game console. In some embodiments, the peripheral may use a different interface, for example, a wireless interface for communication with the game console. The information communicated between the peripheral and the game console may be encrypted, and the information read from or written to the toy by the peripheral may also be encrypted.

The peripheral also includes a radio-frequency (RF) interface 921 to communicate with toys. In many embodiments, the radio-frequency interface is a radio frequency identification (RFID) interface. In other embodiments, the peripheral may include a different interface for communicating with toys, such as an optical interface or a wired interface.

The peripheral includes a controller 901 that is coupled to the USB interface and the radio-frequency interface. The controller adapts the signals between protocols used by the two interfaces. In some embodiments, the controller communicates with the radio-frequency interface based on commands received over the USB interface. For example, the controller may receive commands to determine what toys are present on the peripheral or to read from or write to a particular toy. In other embodiments, the controller may independently communicate with the radio-frequency interface and supply resulting information to a game console over the USB interface. For example, the controller may, via the radio-frequency interface, regularly detect what toys are newly present on the peripheral and report the detected toys to the game console via the USB interface. The controller generally includes a programmable device such as a microprocessor performing program instructions. The program instructions may be stored in the peripheral as firmware or downloaded from the game console.

The peripheral also includes, in some embodiments, a loudspeaker 931. The loudspeaker provides audio signaling to game players and the signaling may relate to a particular toy present on the peripheral. In some embodiments, the peripheral includes visual indicators such as light-emitting diodes 941a-c. The diodes may, for example, be illuminated with intensities or colors according to characteristics of the toy or to signal performance in the video game of characters associated with toys on the peripheral. Both the loudspeaker and visual indicators are coupled to the controller. The controller signals the loudspeaker and visual indicators to operate according to commands received via the USB interface.

Figure 10:
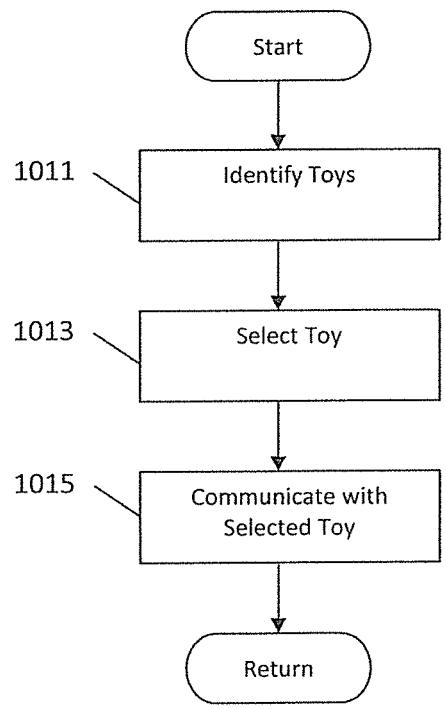
FIG. 10 is a flowchart of a process for conducting game play in accordance with aspects of the invention.

FIG. 10 is a flowchart of a process for communication with toys in accordance with aspects of the invention. The process may be implemented by a video game peripheral, a video gaming platform, or a combination of devices. Additionally, the process may be implemented using a processor configured by program instructions. The process may be performed utilizing a standardized protocol, for example, the ISO/IEC 14443 standard for Identification Cards. Accordingly, the process may communicate with toys via radio-frequency communication.

In block 1011, the process identifies toys in a defined region. For example, the process may determine what toys are on the surface of a video game peripheral as shown in FIG. 9. In various embodiments, the toys may be identified by RFID, barcodes, or optical recognition. In one embodiment, identification of toys includes a video game peripheral reading identifiers of the toys and supplying the identifiers to a video gaming platform. In one embodiment, the toy having rewritable memory or identification tag to store the identity of characters encountered or defeated during game play, the identity of other video game objects, or other game-related information may include a separate memory location or tag for a numeric identification code identifying the toy object as one having rewritable memory or tag to store new character identifications, video game objects identifications, or game-related data.

In block 1013, the process selects a toy for communication. The process may select the toy by transmitting a selection command having an identifier matching the identifier of the toy. In many embodiments, the process expects to receive an acknowledgment of the selection from the toy. When an acknowledgment is not received, the process may retransmit the selection command or may signal a video game associated with the process that the selected toy is not available.

In block 1015, the process communicates with the selected toy. For example, the process may read from a particular memory location of the toy or may write to a particular memory location of the toy. In many embodiments, the process expects to receive an acknowledgment or response from the toy, and when not received, the process may retransmit the command or may signal the video game associated with the process that the selected toy is not available. The process thereafter returns.

Figure 11:
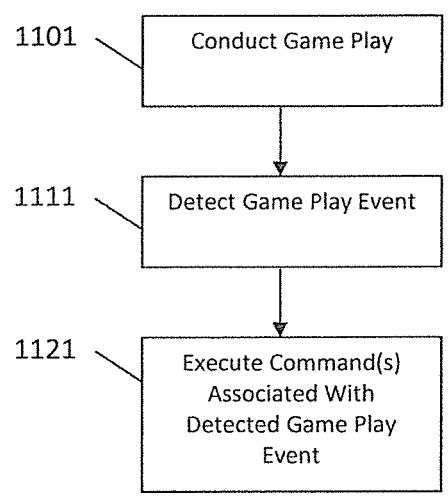
FIG. 11 is a flowchart of a process for executing commands associated with game play events in accordance with aspects of the invention.

FIG. 11 is a flowchart of a process for executing commands associated with game play events in accordance with aspects of the invention. In block 1101, the process conducts game play. In some embodiments the process may conduct game play by way of a processor of a video game platform executing instructions to conduct a game play sequence based in part on inputs by a player. In block 1111, the process detects a game play event. For example, in some embodiments a video game platform may include a data structure including a plurality of predetermined game play events, with the processor of the video game platform determining if any of the predetermined events has occurred. Game play events may include any occurrences or achievements within the game, for example, encountering or defeating of other characters either controlled by another user or by the game console, or completing or overcoming a certain game play challenge or obstacle. Each game play event may be associated with one or more commands to be carried out in connection with the game play event. For example, in one embodiment, the event of encountering or defeating another character may have associated with it the command of writing the identification of the defeated character to the memory of the user's toy. In block 1121, the process executes the one or more associated commands in response to detecting the game play event.

Figure 12:
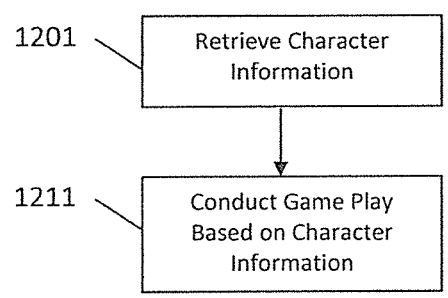
FIG. 12 is a flowchart of a process for conducting game play in accordance with aspects of the invention.

FIG. 12 is a flowchart of a process for conducting game play in accordance with aspects of the invention. In block 1201, the process retrieves information related to the character. In some embodiments the information may be retrieved by a video game system, or by part of a video game system. The character information may be retrieved from a video game disc, a remote server, a memory of the physical toy, or some combination as described above. The character information may include, for example, an identification of characters encountered or defeated by the user in previous gaming sessions. In another embodiment, the character information may include the identification of other video game objects and/or characteristics, powers, and/or attributes of characters encountered or defeated by the user in previous gaming sessions. In block 1211, the process executes instructions to conduct a game play sequence based at least on the character information retrieved. For example, in some embodiments, the user may play with or otherwise control a character encountered or defeated by the user in previous gaming sessions. In other embodiments, the character encountered or defeated by the user in previous gaming sessions may play alongside another character played by the user. In further embodiments, one of the user's characters may be altered or enhanced with the characteristics, powers, and/or abilities of characters encountered or defeated by the user in previous gaming sessions. In some embodiments the operations of block 1211 of the process are performed by a processor of the video game device.

Although the invention has been discussed with respect to various embodiments, it should be recognized that the invention comprises the novel and non-obvious claims supported by this disclosure.

What is claimed is:

1. A system useful in providing videogame play, comprising:
    a game device including at least one processor;
    a first toy including rewritable memory storing information relating to a first game character;
    a peripheral device in communication with the game device, the peripheral device including circuitry for wirelessly commanding reads and writes to the rewritable memory of the toy;
    the at least one processor configured by program instructions to:
        load information relating to the first game character from the first toy into the game device through the peripheral;
        provide gameplay in which a first game character under control of user inputs to the game device encounters a second game character, the second game character controlled by video game instructions of the video game;
        detect a game play event indicating capture of the second game character;
        command writing of information of the second game character to memory of a second toy; and
        command presentation of a sensory perceptible simulated transfer of the second game character to the toy.

2. The system of claim 1, wherein the peripheral includes a light source, and the processor is configured to command presentation of the sensory perceptible simulated transfer by commanding generation of light by the light source.

3. The system of claim 2, wherein the second toy includes at least some translucent portions illuminatable by the light from the light source.

4. The system of claim 3, wherein the peripheral includes a cavity dimensioned to receive at least a portion of the second toy.

5. The system of claim 4, wherein translucent portions of the second toy include at least some portions receivable by the cavity.

6. The system of claim 5, wherein translucent portions of the second toy further include at least some portions not receivable by the cavity.

7. The system of claim 2, wherein the toy includes at least some translucent portions illuminatable by the light from the light source.

8. The system of claim 1, wherein the peripheral includes a speaker, and the processor is configured to command presentation of the sensory perceptible simulated transfer by commanding generation of sound by the speaker.

9. The system of claim 1, wherein the peripheral includes a speaker and a light source, and the processor is configured to command presentation of the sensory perceptible simulated transfer by commanding generation of sound by the speaker and light by the light source.

10. The system of claim 1, wherein the second game character stored in the memory of the second toy is playable alongside the first game character.

11. The system of claim 1, wherein the peripheral includes a light source, and the processor is configured to command presentation of the sensory perceptible simulated transfer by commanding generation of light by the light source.

12. A system useful in providing videogame play, comprising:
    a game device including at least one processor;
    a toy including rewritable memory storing information relating to a first game character;
    a peripheral device in communication with the game device, the peripheral device including circuitry for wirelessly commanding reads and writes to the rewritable memory of the toy;
    the at least one processor configured by program instructions to:
        load information relating to the first game character from the toy into the game device through the peripheral;
        provide gameplay in which a first game character under control of user inputs to the game device encounters a second game character, the second game character controlled by video game instructions of the video game;
        detect a game play event indicating capture of the second game character;
        command writing of information of the second game character to the memory of the toy; and
        command presentation of a sensory perceptible simulated transfer of the second game character to the toy.

\* \* \* \* \*